(12) United States Patent
Elkins (10) Patent No.: US 10,445,872 B2
(45) Date of Patent: Oct. 15, 2019

(54) MACHINE CONTROL MEASUREMENTS DEVICE

(71) Applicant: CNH Industrial America LLC, New Holland, PA (US)

(72) Inventor: Scott A. Elkins, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 1 day.

(21) Appl. No.: 15/288,308

(22) Filed: Oct. 7, 2016

(65) Prior Publication Data

US 2018/0101956 A1    Apr. 12, 2018

(51) Int. Cl.
| | |
|---|---|
| *G06K 9/00* | (2006.01) |
| *G06T 7/00* | (2017.01) |
| *G06T 7/60* | (2017.01) |
| *G06K 9/46* | (2006.01) |
| *G06T 7/73* | (2017.01) |
| *G06T 7/246* | (2017.01) |
| *G05B 19/406* | (2006.01) |
| *G06K 9/32* | (2006.01) |

(52) U.S. Cl.
CPC .......... *G06T 7/001* (2013.01); *G06K 9/00201* (2013.01); *G06K 9/46* (2013.01); *G06T 7/248* (2017.01); *G06T 7/60* (2013.01); *G06T 7/74* (2017.01); *G05B 19/406* (2013.01); *G05B 2219/31308* (2013.01); *G06K 9/3233* (2013.01); *G06T 2207/10004* (2013.01); *G06T 2207/30108* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 8,934,008 B2 | 1/2015 | Rudin et al. | |
| 2011/0115816 A1* | 5/2011 | Brackney | G06Q 10/06 345/629 |
| 2013/0271579 A1 | 10/2013 | Wang | |

OTHER PUBLICATIONS

Extended European Search Report dated Mar. 7, 2018 for European Patent Application No. 17 193 296.5 (8 pages).
Koichi Hashimoto, "A review on vision-based control of robot manipulators", Advanced Robotics, vol. 17, No. 10, Jan. 1, 2003, pp. 969-991 (24 pages).
Peter I. Corke, "Visual Control of Robot Manipulators—A Review", Visual Servoing, Jan. 1, 1993 (31 pages).

* cited by examiner

*Primary Examiner* — Stephen P Coleman
(74) *Attorney, Agent, or Firm* — Peter K. Zacharias; Patrick M. Sheldrake (57) ABSTRACT

A method according to a set of instructions stored on the memory of a computing device. The method including the steps of locating, identifying and determining. The locating step locates at least one reference item in an image of a machine, the reference item having at least one predefined dimensional characteristic. The identifying step identifies a plurality of target points on the machine, the plurality of target points including a first target point and a second target point. The determining step determines a location of the first target point relative to the second target point dependent upon the at least one predefined dimensional characteristic.

10 Claims, 8 Drawing Sheets

MACHINE CONTROL MEASUREMENTS DEVICE

FIELD OF THE INVENTION

The present invention relates to a mobile electronic device, and, more particularly, to an electronic device, such as a mobile computing device, that uses an image of a machine to determine attributes of the machine.

BACKGROUND OF THE INVENTION

Computer vision, image processing and machine vision are phrases that describe approaches used to achieve the somewhat elusive goal of determining whether image data contains some specific object, feature or activity. One form of image processing relates to object recognition wherein classes of objects can be recognized. For example, Blippar is a visual discovery app that uses augmented reality and machine learning to identify objects through smartphones and wearables so that further information can be sought about the object. To use the Blippar app, the user can blipp ("scan") objects they're curious about and the app will present content relative to the object, if the object is recognized by the app. Another example is Google Goggles that can be used for data searches based on pictures taken by a handheld device. For example, taking a picture of a famous landmark can be used to initiate a search for information about the landmark.

Detection within the image data is undertaken when the data is scanned for a specific condition. An example of a detection technique is the detection of a vehicle in an automatic road toll system. Detection is often based on relatively simple and fast computations and is sometimes used for finding smaller regions of interesting image data, which can then be further analyzed by more computationally demanding techniques.

Identification of an individual instance of an object, such as a specific person's face, fingerprint, identification of handwritten digits, or identification of a specific vehicle is another area of image processing that is undertaken in specific instances. For example, some facial recognition algorithms identify facial features by extracting features from an image of the person's face. The algorithm may analyze the relative position, size or shape of the eyes, nose, cheekbones, and jaw. These features are then used to search for other images with matching features. Other algorithms normalize a gallery of face images and then compress the facial data, only saving the data in the image that is useful for subsequent face recognition.

Three-dimensional facial recognition techniques use 3D sensors to capture information about the shape of a face. This information is then used to identify distinctive features on the surface of the face, such as the contour of the eye sockets, nose, and chin. One advantage of 3D facial recognition is that it is not affected by changes in lighting like other techniques. It can also identify a face from a range of viewing angles, including a profile view.

Object recognition is dependent upon comparing relational data to similar data in a database. One problem with this technique is that it does not provide for spatial dimensioning from the image itself.

What is needed in the art is a method to identify machine attributes in an image taken by a mobile device.

SUMMARY OF THE INVENTION

Exemplary embodiments of the present invention provide for the identification of elements and characteristics of a machine from an image of the machine.

In accordance with an aspect of the present invention, there is provided a method of determining relative positions of target points. The method including the steps of locating, identifying and determining. The locating step locates at least one reference item in an image of a machine, the reference item having at least one predefined dimensional characteristic. The identifying step identifies a plurality of target points on the machine, the plurality of target points including a first target point and a second target point. The determining step determines a location of the first target point relative to the second target point dependent upon the at least one predefined dimensional characteristic.

In accordance with another aspect of the present invention, there is provided a computer program product embodied in a tangible non-transitory computer readable storage medium. The computer program product includes computer instructions for: locating at least one reference item in an image of a machine, the reference item having at least one predefined dimensional characteristic; identifying a plurality of target points on the machine, the plurality of target points including a first target point and a second target point; and determining a location of the first target point relative to the second target point dependent upon the at least one predefined dimensional characteristic.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
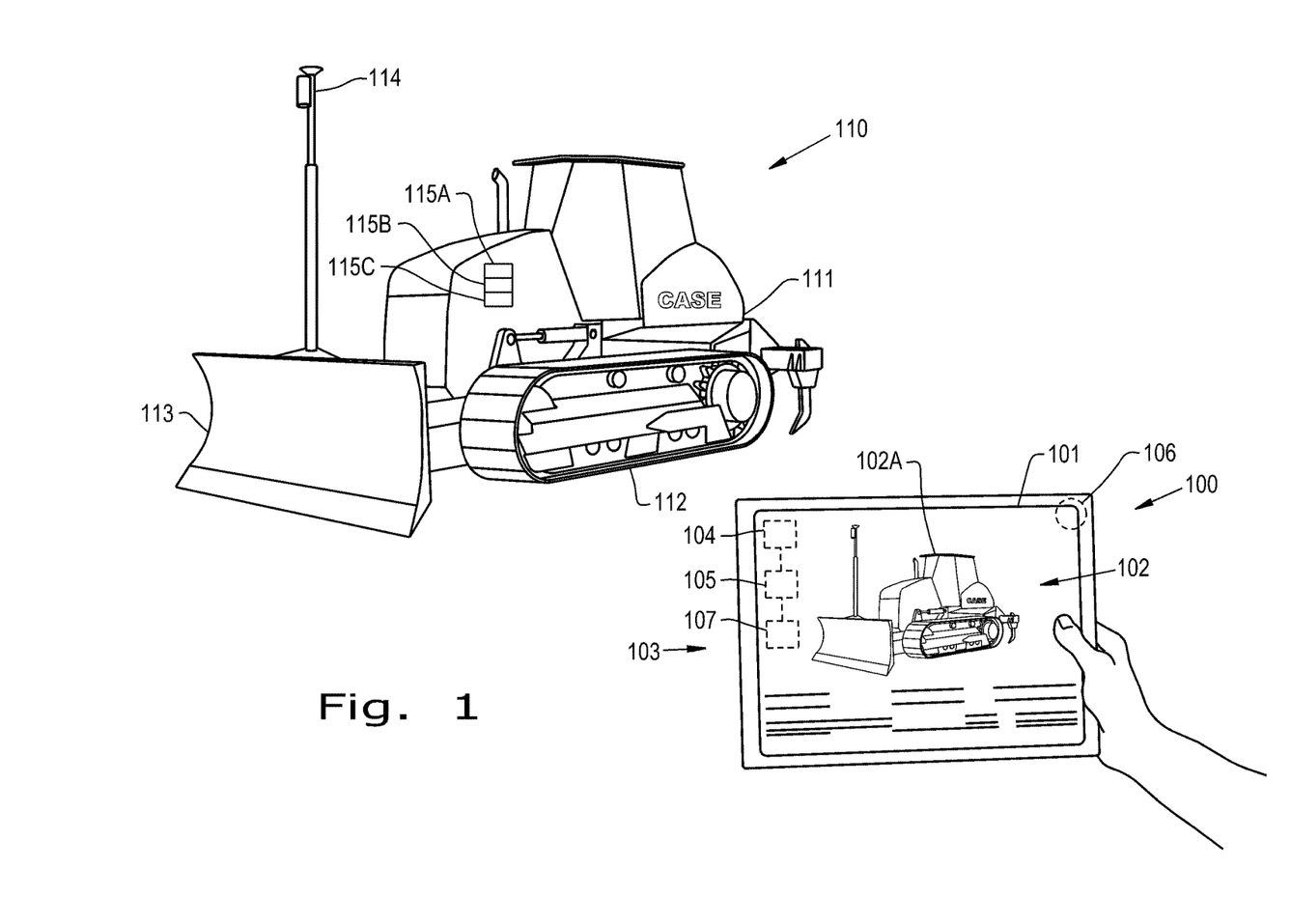
FIG. 1 is a perspective view of an exemplary embodiment of an app used on a mobile imaging device, the app displaying a view of a machine, in accordance with an exemplary embodiment of the present invention.

Referring now to the drawings and more particularly to FIG. 1 there is shown a mobile imaging device 100 comprising a display 101, a processor 104, a memory 105, a camera 106 and a wireless communication device 107, which can be in the form of a wireless modem 107, in accordance with an exemplary embodiment of the present invention. A machine 110, which is in the form of a bulldozer 110 in the exemplary embodiment illustrated in FIG. 1, includes a chassis 111, tracks 112, a blade 113, a positioning system 114, a controller 115A, a memory 115B and a wireless modem 115C. It is to be understood that the machine 110 is not limited to being a bulldozer but may be any particular kind of construction equipment but may include, for example and without limitation, a bulldozer, a skid steer loader, a wheel loader, a tractor-loader-backhoe, etc. Controller 115A can be a resident controller on machine 110, or may be a standalone controller that uses memory 115B and wireless modem 115C to interface with imaging device 100.

Display 101 renders an interface 102 thereon, which interface 102 comprises an image 102A of machine 110. In an exemplary embodiment, the display 101 is further configured to receive user input as well as to display output, e.g., the image 102A. In such exemplary embodiment, the display 101 is a touchscreen display.

The interface 102 and the image 102A are generated by a software tool 103, in the form of a software program 103, based on image data collected by the camera 106 under control of the software program 103, specifically the processor 104. Software program 103 identifies attributes of machine 110 based on the collected image data and uses such attributes to set up machine 110 for optimized performance. Software program 103 reduces the amount of possible error generated by various measuring devices and human error that is experienced with the prior art methods. Although it is implied by FIG. 1 that an operator is using the mobile imaging device 100, it is also contemplated that the imaging device 100 may be operated by a drone or a robotic operator.

Figure 2:
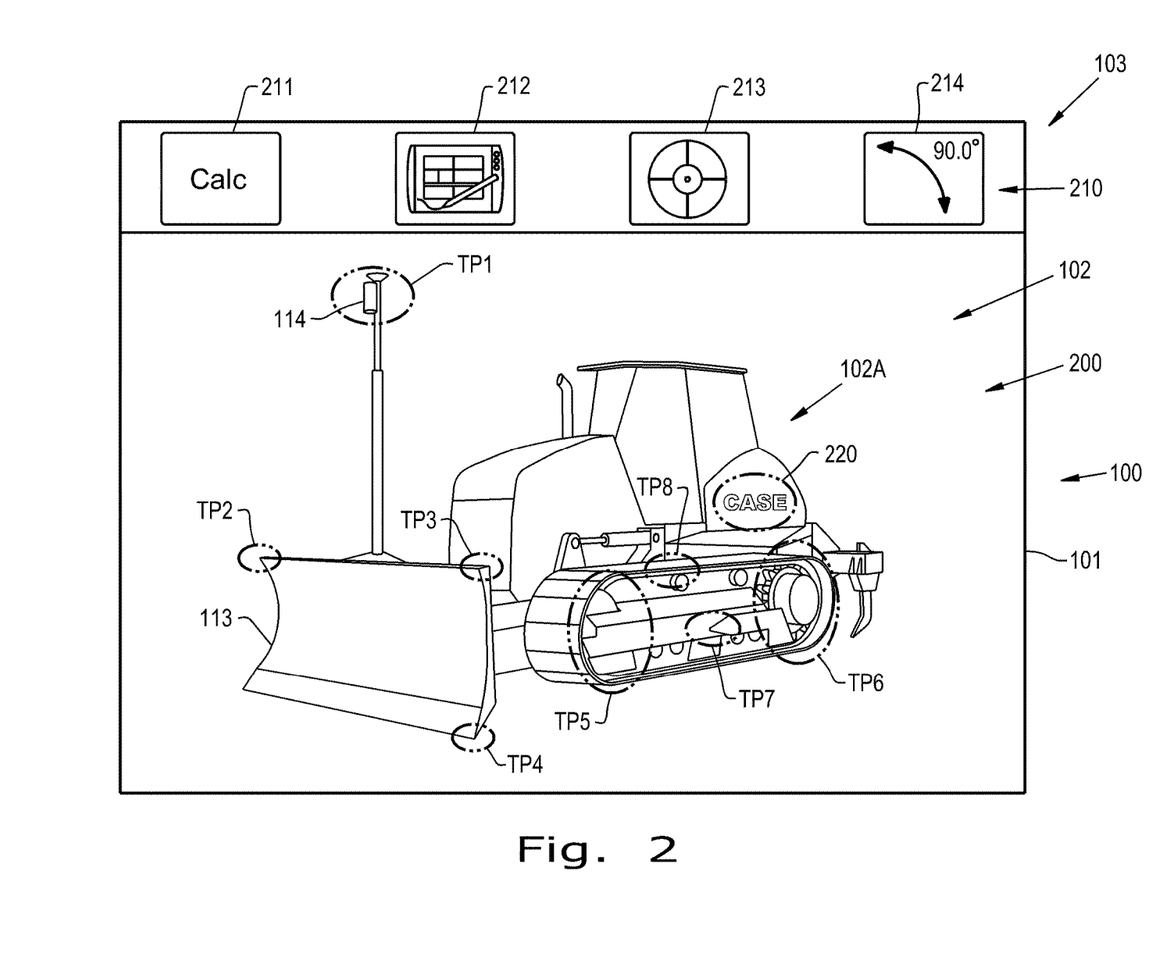
FIG. 2 is a view of the mobile imaging device introduced in FIG. 1 with more details of the display thereon, in accordance with an exemplary embodiment of the present invention.

Now, additionally referring to FIG. 2, there is illustrated an exemplary embodiment of the tools of software program 103 available by way of interface 102 on display 101 of mobile device 100. An image 102A of machine 110 is rendered in image area 200 with a selection area 210 above image area 200. Selection area 210 includes selections 211, 212, 213 and 214. Selection 211 is a calculation button 211, which when activated calculates the dimensions between target points (discussed hereinafter). Selection 212 is a save data or send data button. Selection 213 allows the operator to manually select target points on the image to measure. Selection 214 will initiate a range of motion measurement sequence of operations.

Figure 3:
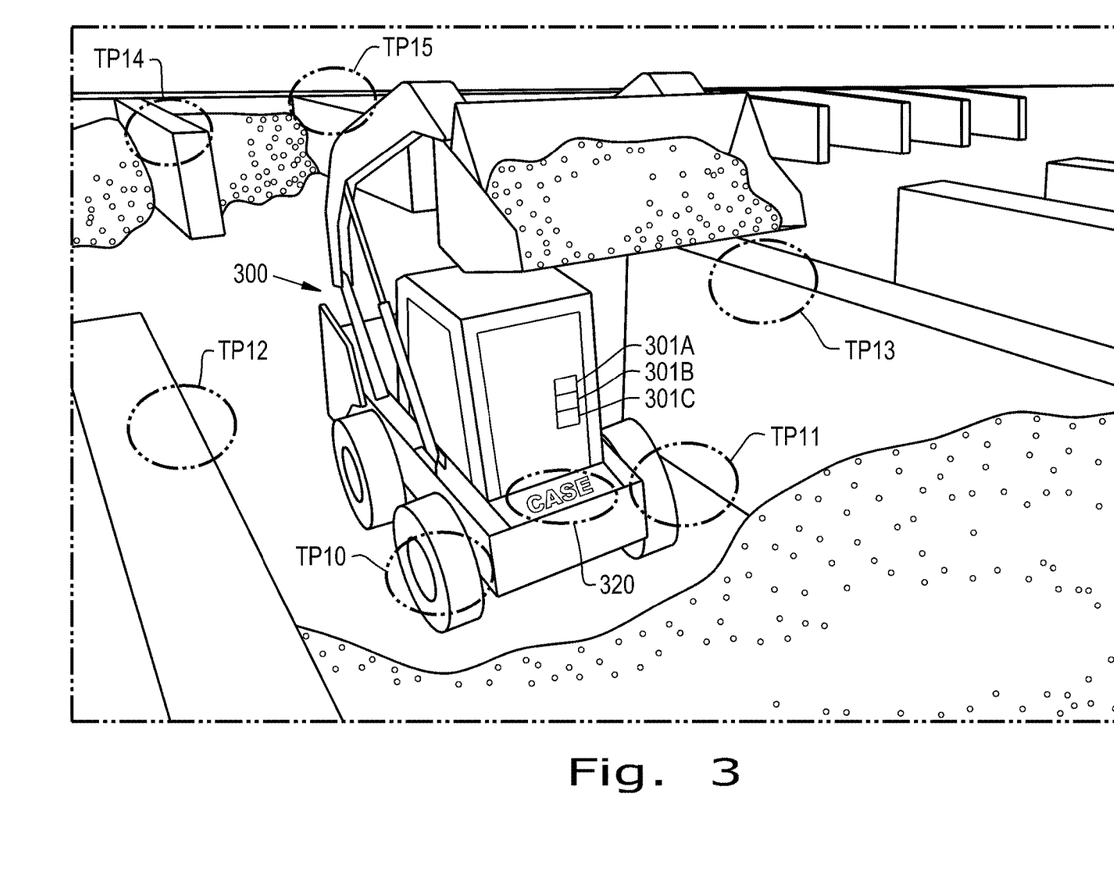
FIG. 3 is a perspective view of a skid loader viewed by the mobile imagining device of FIGS. 1 and 2, in accordance with an exemplary embodiment of the present invention.
Figure 4:
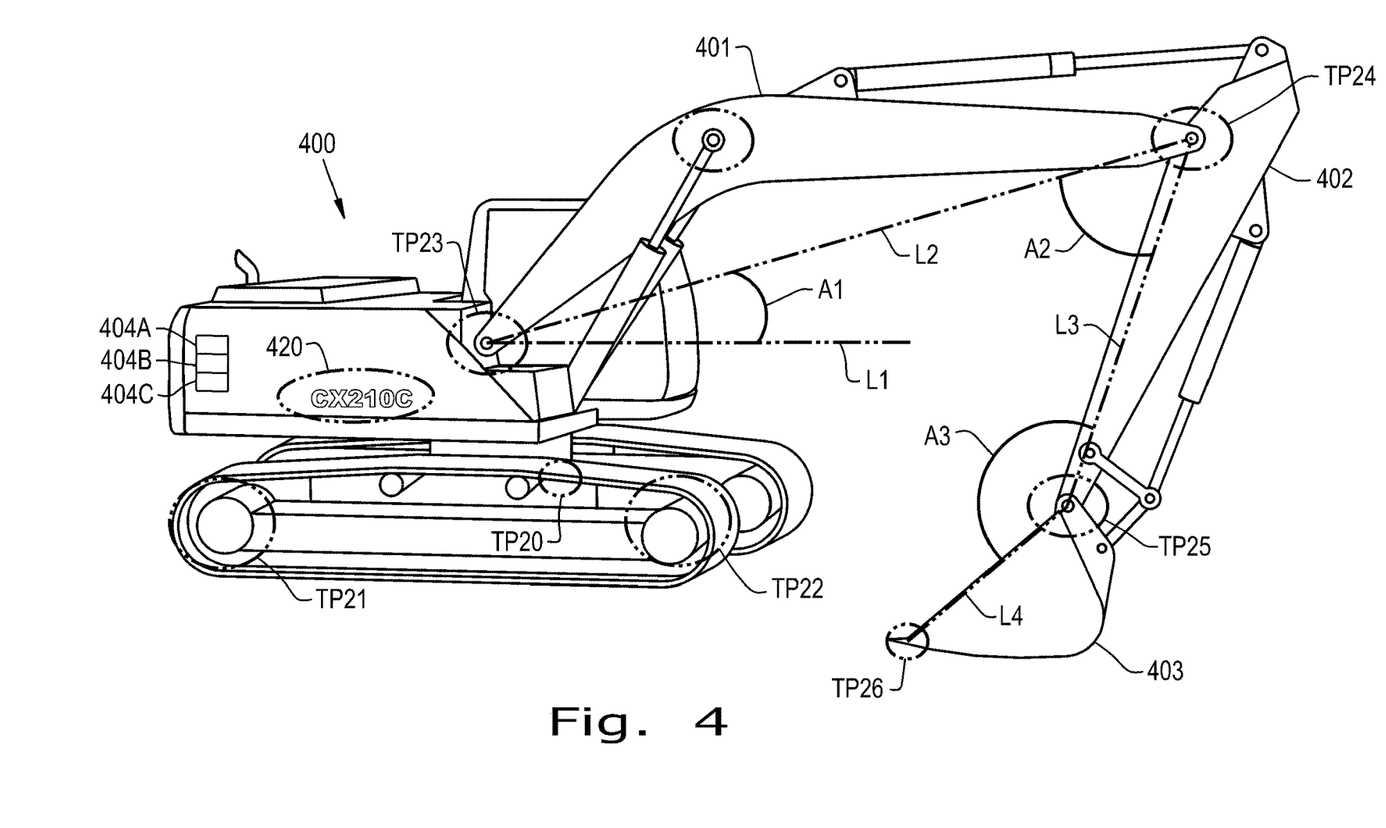
FIG. 4 is a perspective view of an excavator viewed by the mobile imagining device of FIGS. 1 and 2, in accordance with an exemplary embodiment of the present invention.
Figure 5A:
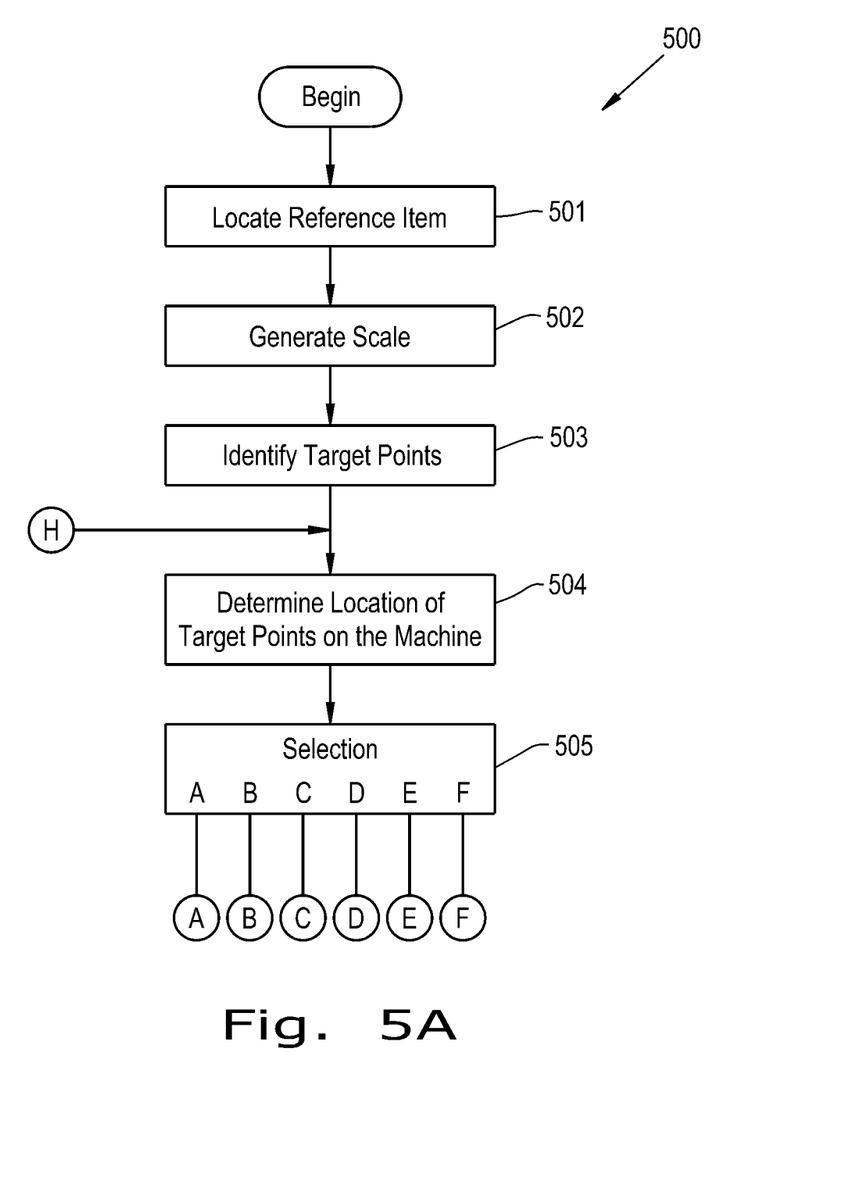
FIGS. 5A-5H illustrate a method, in the form of flowcharts, performed by the mobile imagining device of FIGS. 1 and 2, in accordance with an exemplary embodiment of the present invention.
Figure 5B:
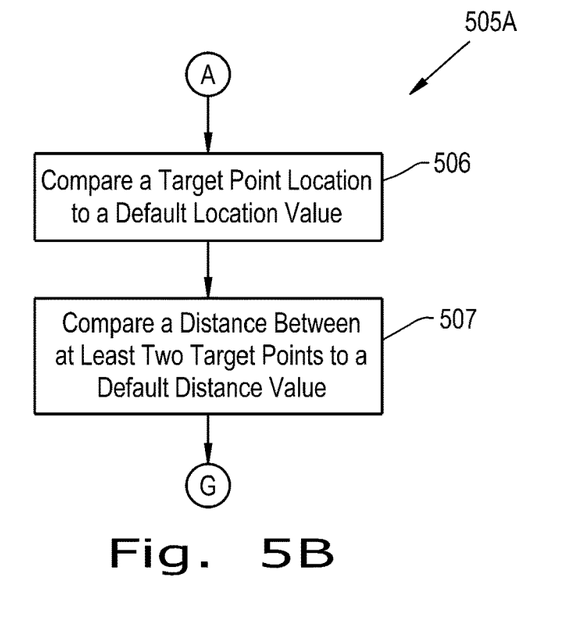
Figure 5C:
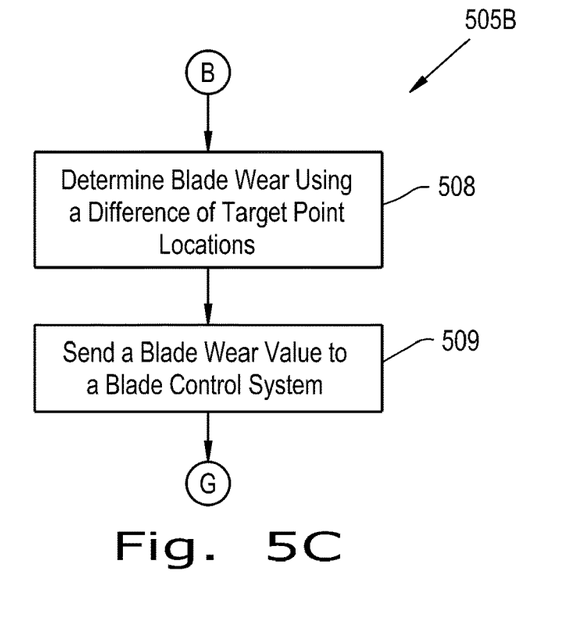
Figure 5D:
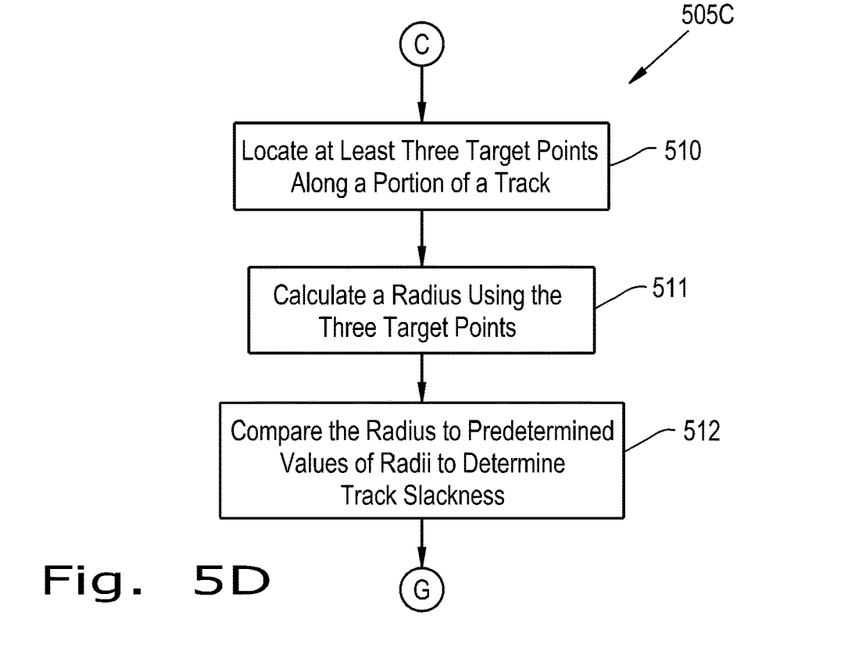
Figure 5E:
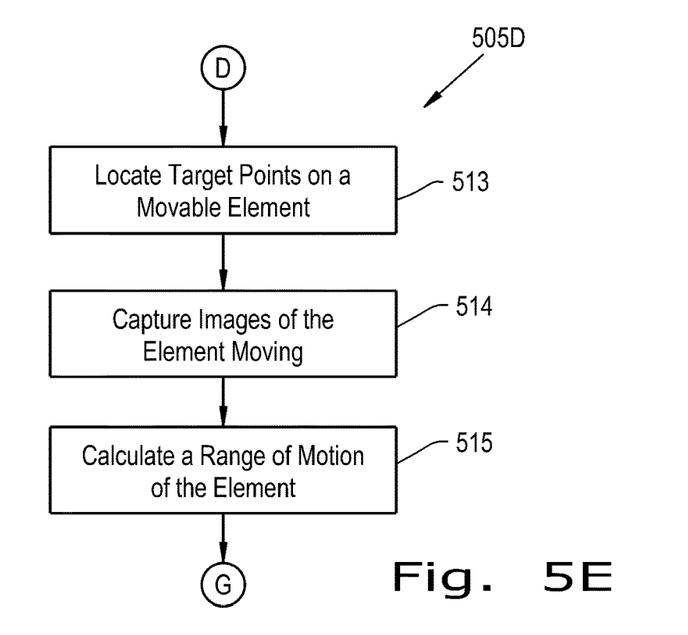
Figure 5F:
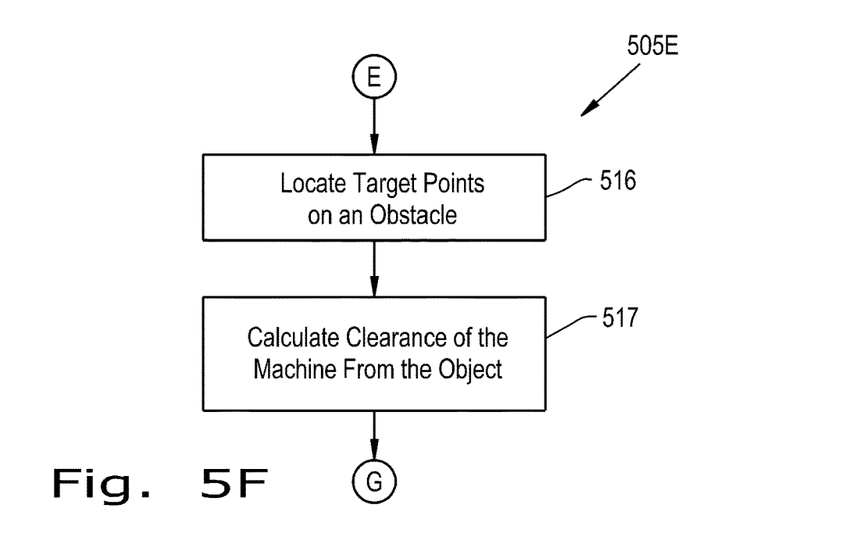
Figure 5G:
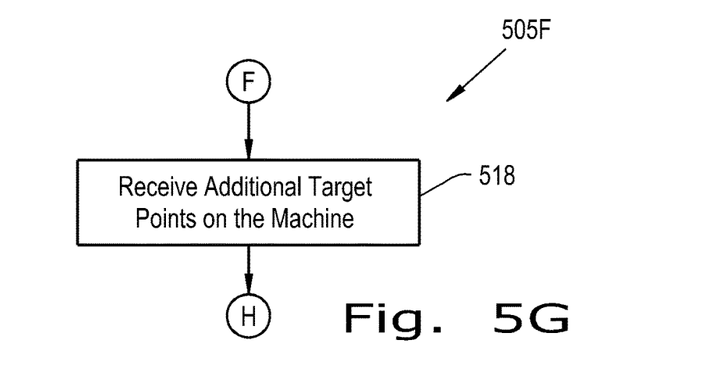
Figure 5H:
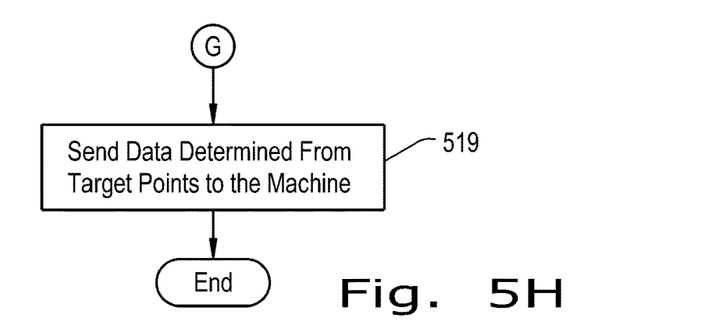

Now, additionally referring to FIGS. 3 and 4 there are illustrated machines 300 and 400 each appearing in image area 200 of device 100 when the user takes the image with mobile imaging device 100. Machine 300 includes a controller 301A, a memory 301B and a wireless modem 301C. Controller 301A can be a resident controller on machine 300, or may be a standalone controller that uses memory 301B and wireless modem 301C to interface with imaging device 100 and to store information received therefrom. In a like manner, machine 400 includes a controller 404A, a memory 404B and a wireless modem 404C. Controller 404A can be a resident controller on machine 400, or may be a standalone controller that uses memory 404B and wireless modem 404C to interface with imaging device 100 and to store information received therefrom.

In FIGS. 5A-5H there is illustrated an exemplary method 500 that is carried out by software program 103. Method 500 is able to take a variety of measurements and then import the data into the desired systems via a wired or wireless link to machines 110, 300 and 400. Method 500 starts with the software program 103 developing a measuring scale by way of a step 501 of locating a reference item 220, 320, 420. The easiest and most inconspicuous scale on a machine is a machine decal 220, 320, 420. For example, on a Case M Series Dozer, there is a "CASE" decal 220 on both sides of the machine and one on the rear (not shown); there is also a Case Construction emblem (also not shown) on the front grill of the machine. The dimensions of these items are known and are held to a certain tolerances to provide optimal reference scales. Alternatively, the reference device to determine the scale can be any object of known dimensions. If the object isn't a part of the machine itself then the reference item can be placed within view of the image. The reference item 220, 320, 420 is preferably attached to the machine, but is not necessarily a functional part of the machine.

At step 502, a scale is generated by software program 103 to provide measurements between the target points. The scale is arrived at by considering the known dimensions of the reference item 220, 320, 420 and the angle from which image 102 was taken.

At step 503, target points TP1-TP8, TP10-TP15, and TP20-TP26 (TP being used to generically refer to the target points) are respectively identified on machines 110, 300 and 400 by software program 103 as method 500 is separately applied to each of these three examples. The number of reference points required is determined by the images taken of the machine and the number of angles from which each target point TP is visible. Because these reference items 220, 320, 420 are available on all sides of the machine 110, 300, 400, images from any angle and various distances can be provided to make the measurements. In the embodiment of the device 100 described above, the device 100 comprises a camera 106. In such embodiment, the device 106 may begin processing the measurements as soon as the image data is collected by the camera 106. In embodiments of the device 100 in which there is no integral camera 106, the camera 106 is separate from the device 100. In such embodiment, image data is captured by the external camera 106 and uploaded onto the device 100. After receiving the image data, the device 00 may then begin processing the measurements.

After first locating the reference items 220, 320, 420 at step 501 by software program 103, to thereby generate the 3D scale at step 502, then at step 503 software program 103 identifies target points TP on the machine 110, 300, 400. Using the scale developed at step 502 the location of the target points TP are determined at step 504 by software program 103. These target points TP are machine specific, and a default database of points TP are based on the various known onboard systems and their required measurements. The database of points TP may be stored in memory 105, or memories 115B, 301B, or 404B as applicable.

At step 505, software program 103 receives a selection made by the operator, as to what attributes of the machine 110, 300, 400 will be measured and analyzed. Here those choices are generically referred to as choices 505A-505F with the letter thereof being referred to (within a circle) in the flow charts of FIGS. 5A-5H. In an exemplary alternative embodiment of step 505, software program 103 determines which attributes of the machine 110, 300, 400 will be measured an analyzed.

When portion 505A of method 500 is executed by software program 103 a target point TP location is compared to a default location contained in the database at step 506 by software program 103. For example, the location of target point TP2 (the corner of blade 113) can be indicative as to what type of blade 113 is installed on machine 110 allowing software program 103 to determine a configuration of machine 110. At step 507, a distance between a set of target points TP is undertaken by software program 103, such as a distance between TP1 and TP4, with a vertical component thereof indicating the delta distance between blade positioning system 114 and the bottom edge of blade 113.

When portion 505B of method 500 is executed by software program 103 a blade 113 wear value is calculated by software program 103 by taking a difference between target points TP at step 508. For example, the difference between target points TP3 and TP4 will show the current face height of blade 113, which is compared by software program 103 to an unworn dimension of blade 113 to determine the amount of wear experienced by blade 113. At step 509, the blade wear value is sent to blade control system 114 by software program 103.

When portion 505C of method 500 is executed by software program 103 a slackness of track 112 is determined by software program 103 at steps 510-512. At step 510 at least three points along track 112 are located by software program 103, for example within target point TP8. The three or more points are used by software program 103 to calculate a radius of track 112 along that portion of track 112 at step 511. This calculated radius is compared to predetermined acceptable radii for track 112 by software program 103 to arrive at a slackness value at step 512.

When portion 505D of method 500 is executed by software program 103, for example by activating selection 214, a range of motion of movable elements, for example elements 401-403, is calculated by software program 103 at steps 513-515. At step 513, target points TP, such as target points TP23, TP24, TP25, are identified and located by software program 103 as pivot points and target point TP26 is identified and located by software program 103 as the extent of the teeth on hoe bucket 403. As elements 401-403 move images are captured by software program 103 at step 514, which may be a series of still images or a movie, and then the range of motion of elements 401-403 is calculated at step 515 by software program 103. The calculation is based on establishing lines L1-L4 with angles A1-A3 being measured to effectively compute the motion that target point TP26 can move relative to pivot target point TP23. Line L1 is a horizontal reference line, line L2 extends from pivot target point TP23 to pivot target point TP24, and line L3 extends from pivot target point TP24 to pivot target point TP25. The movement of elements 401-403 to each of their relative extreme limits allows software program 103 to then calculate the full range of motion of machine 400 and thus the effective reach of the hoe.

When portion 505E of method 500 is executed by software program 103 clearance information of the machine is obtained by the execution of steps 516 and 517. At step 516, target points TP on an obstacle and on the machine 300 are obtained by software program 103 and at step 517 clearance calculations are made by software program 103 to determine if the machine 300 can fit between the obstacles or can get around an obstacle. For example, target points TP10 and TP11 are established on machine 300, which are at the outer extremes of the wheels of machine 300, and in a like manner target points TP12 and TP13 are established and located with the distances being determined to show that machine 300 can enter between the walls that have target points TP12 and TP13 assigned thereto. Additionally, another set of obstacles established by target points TP14 and TP15 can be measured by software program 103 to ensure that machine 300 can also enter therebetween.

When portion 505F of method 500 is executed by software program 103, for example by activating icon 213, additional target points on machine 110, 300, 400 are manually designated, at step 518, by the operator of device 100 to establish additional locations and measurements of interest to the operator.

At step 519 the software program 103 sends data from the respective portions of method 500 (represented by portions 505A-505E) to machine 110, 300, 400 by way of wireless communication device 107 to wireless devices 115C, 301C or 404C.

The operator of device 100 has the ability to add target points TP if desired and also manually mark points to measure custom distances along the machine, which target points TP and mark points are received by the software program 103 in the step 518. Basic target points TP may be machine extremities, max height, width, length, which can be used to ensure that the machine 110, 300, 400 meets local shipping requirements. Some examples of vehicle targets include blade height (difference between target points TP3-TP4) on a dozer or grader, the initial snapshot can be used by an Automated Blade Control system as part of their required setup. Future snapshots of the blade height can then be reentered into the Automated Blade Control system to update the "Blade Wear" Value needed to optimize its performance.

Track slack (steps 510-512) is another system that requires regular monitoring, rather than doing the manual measurements of the prior art method, a simple picture is taken by software program 103 using the camera 106 and then compared by the software program 103 to a known target, with software program 103. As a result of the comparison, the software program 103 indicates in the display 101 whether the tracks 112 are currently on target or too tight or too loose.

Aside from static measurements the software 103 measure ranges of motion (steps 513-515) through either video captures or a sequence of snapshots in which case the machine elements and/or attachments are being shown at their extreme points. An example of this would be an excavator boom, stick and bucket (FIG. 4). The initial image will allow software program 103 to measure the static dimensions of each of these. Then when a video is taken of say the buckets (403) range of motion, the software 103 analyzes the video to determine the extremities reached providing not only the angular values of angle A3 for the possible locations of the bucket 403 but also the location of the cutting edge (target point TP26) throughout the range of motion. This information could then be transmitted by the modem XYZ of the device 100 to the machine 400, which receives the information via its modem XYZ and forwards it to its controller XYZ and then to a bucket indicate system (step 519) for its calibration process. This has added value, in that when bucket 403 is replaced the new attachment dimensions and motions would be captured with, for example, a 30 second video.

The resolution of the camera 106 in device 100 will determine the maximum allowable distance from the machine 110, 300, 400 as well as the level of accuracy in the measurements. The data can be transferred to any electronic device using a wired or a wireless connection. However, desirably the device 100 is portable and includes an integral camera 106. In this case then the operator would simply take the images and/or videos of the machine 110, 300, 400. Enter the machine and connect handheld device 100 up to the system. All the calculations and calibration data would be configured in the background so the system would be ready to go once the machine 100 is keyed on.

Advantageously, software 103 could be used to ensure that the machine 110, 300, 400 is within legal shipping limits (dimensionally) loaded or unloaded. It could also be used to help determine if the machine can fit within constrained spaced, so long as that reference scale is established it can compare vehicle dimensions to any surroundings. The target points TP of the surroundings require the manual input to identify the measurement targets, but that is quickly calculated rather then best guess by the human eye. Also, as mentioned above the invention can be used to continuously monitoring common wear points, such as blade wear, track wear, track slack, etc. by snapping a picture of these before daily operations it can be compared to previous data values and used to help determine service intervals.

This software/software program 103 could be added to the End of Line operation in manufacturing. It could be used to measure and upload certain vehicle characteristics as needed rather than the manufacturing engineer needing to manual select. For example, if an overhead camera 106 was installed then it would be used to detect wide tracks vs. narrow tracks, or tire size. From just the image it could instantly upload the build data base as well as update any machine controllers that use this information. Blade size, bucket size, boom/stick lengths, any measurement that manufacturing needs to manually enter in today can be automated.

It is also contemplated that a database is established of target points TP for common vehicle setups and then having the capability of the software 103 to identify these targets points TP within a picture/video. The ability to compare measurements between images over time of the same machine 110, 300, 400 to determine things like wear levels. The ability to measure and calculate a range of motion through a sequence of images or a video. The ability to transmit this data into vehicle and/or aftermarket systems database for use rather then having to still manually enter the values.

Software program 103 is executed by the processor 104 of device 100. Software program 103 is embodied as software instructions that are tangible encoded, i.e., stored, in the memory 105 of the device 100. Upon loading by the processor 104 of the software instructions stored in the memory 105 and execution of the software instructions by the processor 104, the processor 104 may perform any of the functionality of the processor 104 described herein, including any steps of the method 500 described herein. Thus, software program 103 may be thought of as a computer program product, e.g., software instructions, that is embodied in the tangible non-transitory computer readable storage medium 105 or as the functionality performed by the device 100, specifically the processor 104, as a result of executing such software instructions.

It is contemplated that device 100 may be a mobile computing device, such as a smart phone 100, a tablet 100, a netbook 100, a set of imaging glasses 100, a notebook computer 100, or the like, a desktop computing device, such as a desktop computer 100, or a networked computing system, such as the cloud. It is to be understood that the memory 105 is a tangible computer readable medium 105, such as a magnetic medium, e.g., a computer hard drive, an optical medium, e.g., an optical disc, solid-state memory, e.g., flash memory, or other storage media known in the art.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A computer program product, the computer program product being embodied in a tangible non-transitory computer readable storage medium and comprising computer instructions for:
    locating at least one reference item in an image of a machine, the reference item having at least one predefined dimensional characteristic;
    identifying a plurality of target points on the machine, the plurality of target points including a first target point and a second target point;
    determining a location of the first target point relative to the second target point dependent upon the at least one predefined dimensional characteristic; and
    determining a blade wear value of the machine by using a difference between the first target point located at the top of the blade and the second target point located at the bottom of the blade.

2. The computer program product of claim 1, further comprising the step of comparing a location of the first target point to a default location value for the first target point.

3. The computer program product of claim 1, further comprising the step of comparing a distance between the first target point and the second target point to a default distance value.

4. The computer program product of claim 1, further comprising the step of sending the blade wear value to a blade control system of the machine.

5. The computer program product of claim 1, further comprising the step of determining a clearance of the machine relative to at least one obstacle by:
    locating some of the target points on the at least one obstacle; and
    calculating the clearance of the machine relative to the obstacle.

6. A computer program product, the computer program product being embodied in a tangible non-transitory computer readable storage medium and comprising computer instructions for:
    locating at least one reference item in an image of a machine, the reference item having at least one predefined dimensional characteristic;
    identifying a plurality of target points on the machine, the plurality of target points including a first target point and a second target point;
    determining a location of the first target point relative to the second target point dependent upon the at least one predefined dimensional characteristic; and
determining a slackness of a track of the machine by:
    locating at least three of the plurality of target points along the track;
    calculating a radius of the track; and
    comparing the radius to predetermined values of track radii to thereby determine the slackness.

7. The computer program product of claim 6, further comprising the step of determining a clearance of the machine relative to at least one obstacle by:

locating some of the target points on the at least one obstacle; and     calculating the clearance of the machine relative to the obstacle.

8. A computer program product, the computer program product being embodied in a tangible non-transitory computer readable storage medium and comprising computer instructions for:

locating at least one reference item in an image of a machine, the reference item having at least one predefined dimensional characteristic;

identifying a plurality of target points on the machine, the plurality of target points including a first target point and a second target point;

determining a location of the first target point relative to the second target point dependent upon the at least one predefined dimensional characteristic; and     determining a range of motion of the machine by:

locating some of the target points along a pivotal or extendable element of the machine;

capturing images of the machine pivoting or extending the element; and         calculating the range of motion from the captured images.

9. The computer program product of claim 8, wherein at least one of the target points is located at a pivot point of the element.

10. The computer program product of claim 8, further comprising the step of determining a clearance of the machine relative to at least one obstacle by:

locating some of the target points on the at least one obstacle; and     calculating the clearance of the machine relative to the obstacle.

* * * * *